(12) United States Patent
Yonemura et al.

(10) Patent No.: US 9,878,310 B2
(45) Date of Patent: Jan. 30, 2018

(54) CATALYST FOR HYDROLYSIS OF CARBONYL SULFIDE AND HYDROGEN CYANIDE AND USE OF TITANIUM DIOXIDE-BASED COMPOSITION

(71) Applicant: MITSUBISHI HEAVY INDUSTRIES, LTD., Tokyo (JP)

(72) Inventors: Masanao Yonemura, Tokyo (JP); Toshinobu Yasutake, Tokyo (JP); Shuji Fujii, Tokyo (JP); Koji Higashino, Tokyo (JP); Makoto Susaki, Tokyo (JP); Kaori Yoshida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/373,597

(22) PCT Filed: Feb. 14, 2013

(86) PCT No.: PCT/JP2013/053524
§ 371 (c)(1),
(2) Date: Jul. 21, 2014

(87) PCT Pub. No.: WO2013/125437
PCT Pub. Date: Aug. 29, 2013

(65) Prior Publication Data
US 2014/0369915 A1    Dec. 18, 2014

(30) Foreign Application Priority Data

Feb. 24, 2012 (JP) ................................. 2012-038796

(51) Int. Cl.
*B01J 27/25* (2006.01)
*B01J 27/232* (2006.01)
(Continued)

(52) U.S. Cl.
CPC .......... *B01J 27/25* (2013.01); *B01D 53/8606* (2013.01); *B01D 53/8621* (2013.01);
(Continued)

(58) Field of Classification Search
CPC ...................................................... B01J 27/25
See application file for complete search history.

(56) References Cited

U.S. PATENT DOCUMENTS 4,511,668 A * 4/1985 Nozue ................ B01D 53/8606
423/244.04
5,466,427 A * 11/1995 Rumpf ............... B01D 53/8603
423/210
(Continued)

FOREIGN PATENT DOCUMENTS

| CN | 101239319 A | 8/2008 |
| JP | 7-148430 A | 6/1995 |

(Continued)

OTHER PUBLICATIONS

Notification of Transmittal Translation of Translation of the International Preliminary Report on Patentabililty (Form PCT/IB/338) of International Application No. PCT/JP2013/053524 dated Sep. 4, 2014 with Forms PCT/IB/373 and PCT/ISA/237 (12 pages).

(Continued)

*Primary Examiner* — Melvin C Mayes
*Assistant Examiner* — Michael Forrest
(74) *Attorney, Agent, or Firm* — Westerman, Hattori, Daniels & Adrian, LLP

(57) ABSTRACT

Provided are a catalyst for hydrolysis and use of a titanium dioxide-based composition which are capable of removing COS and HCN simultaneously at high degradation percentages. The catalyst for hydrolysis is a catalyst for hydrolysis of carbonyl sulfide and hydrogen cyanide, having at least: an active component containing, as a main component, at least (Continued)

one metal selected from the group consisting of barium, nickel, ruthenium, cobalt, and molybdenum; and a titanium dioxide-based support supporting the active component.

2 Claims, 1 Drawing Sheet

(51) Int. Cl.
| | |
|---|---|
| *B01J 27/24* | (2006.01) |
| *B01D 53/86* | (2006.01) |
| *B01J 21/06* | (2006.01) |
| *B01J 23/02* | (2006.01) |
| *B01J 37/00* | (2006.01) |
| *B01J 21/08* | (2006.01) |
| *B01J 23/755* | (2006.01) |
| *B01J 23/28* | (2006.01) |
| *B01J 23/46* | (2006.01) |
| *B01J 23/75* | (2006.01) |
| *B01J 35/04* | (2006.01) |

(52) U.S. Cl.
CPC .............. *B01J 21/063* (2013.01); *B01J 23/02* (2013.01); *B01J 23/28* (2013.01); *B01J 23/462* (2013.01); *B01J 23/75* (2013.01); *B01J 23/755* (2013.01); *B01J 27/232* (2013.01); *B01J 27/24* (2013.01); *B01J 35/04* (2013.01); *B01D 2255/2042* (2013.01); *B01D 2255/20746* (2013.01); *B01D 2255/20753* (2013.01); *B01D 2255/20769* (2013.01); *B01D 2257/30* (2013.01); *B01D 2257/408* (2013.01); *B01J 21/066* (2013.01); *B01J 21/08* (2013.01); *B01J 37/0018* (2013.01)

(56) References Cited

U.S. PATENT DOCUMENTS

| | | | | |
|---|---|---|---|---|
| 5,922,294 | A | * | 7/1999 | Chattha .................. B01J 21/063 423/213.2 |
| 6,956,006 | B1 | * | 10/2005 | Mirsky .................. B01J 21/063 106/436 |
| 2004/0247507 | A1 | | 12/2004 | Nedez et al. |

FOREIGN PATENT DOCUMENTS

| | | | |
|---|---|---|---|
| JP | 8-89807 | A | 4/1996 |
| JP | 11-99319 | A | 4/1999 |
| JP | 11-276897 | A | 10/1999 |
| JP | 11276897 | A * | 10/1999 ......... B01D 53/8606 |
| JP | 2004-331701 | A | 11/2004 |
| JP | 2005-504631 | A | 2/2005 |
| JP | 3746609 | B2 | 2/2006 |
| JP | 2010-209296 | A | 9/2010 |
| JP | 4556159 | B2 | 10/2010 |

OTHER PUBLICATIONS

International Search Report dated Apr. 9, 2013 issued in correponding application No. PCT/JP2013/053524.
Office Action dated Aug. 25, 2016, issued in counterpart Chinese Patent Application No. 201380005311.0 w/English translation (17 pages).
Office Action dated Jan. 13, 2016, issued in counterpart Chinese Patent Application No. 201380005311.0 w/ English translation (18 pages).
Pae et al., "Correlation between acidic properties of nickel sulfate supported on TiO2—ZrO2 and catalytic activity for ethylene dimerization", Catalysis Letters, Feb. 28, 2005, vol. 99, Nos. 3-4. pp. 241-248, Cited in CN Office Action dated Jun. 3, 2015.
Choque et al., "Ruthenium supported on new TiO2—ZrO2 systems as catalysts for the partial oxidation of methane", Catalysis Today. Nov. 1, 2009, vol. 149, pp. 248-253, Cited in CN Office Action dated Jun. 3, 2015.
Jongsomjit et al., "Catalytic behaviors of mixed TiO2—SiO2-supported cobalt Fischer-Tropsch catalysts for carbon monoxide hydrogenation", Material Chemistry and Physics, Dec. 31, 2008, vol. 97, pp. 343-350, Cited in CN Office Action dated Jun. 3, 2015.
Reddy et al., "An XPS study of the dispersion of MoO3 on TiO2—ZrO2,TiO2—SiO2,TiO2—Al2O3,SiO2—ZrO2,and SiO2—TiO2—ZrO2 mixed oxides", Applied Catalysis A: General. Dec. 31, 2001, vol. 211, pp. 19-30. Cited in CN Office Action dated Jun. 3, 2015.
Office Action dated Jun. 3, 2015, issued in counterpart Chinese Patent Application No. 201380005311.0, with English translation (20 pages).
Office Action dated Nov. 10, 2015, issued in counterpart Australian Patent Application No. 2013223391. (4 pages).
European Search Report dated Sep. 16, 2015, issued in European Patent Application No. 13752372.6. (3 pages).
European Search Opinion dated Nov. 5, 2015, issued in European Patent Application No. 13752372.6. (3 pages).
Ishii, Tadao, "Surface Reactivity of Powders in Barium Carbonate-Titanium Dioxide Reaction Systems by Emanation Thermal Analysis," Reactivity of Solids, vol. 3, No. 1-2, Apr. 1, 1987, pp. 85-100, (Cited in EP Search Report dated Sep. 16, 2015).
Notice of Allowance dated May 24, 2016, issued in counterpart Australian Patent Application No. 2013223391. (22 pages).

* cited by examiner

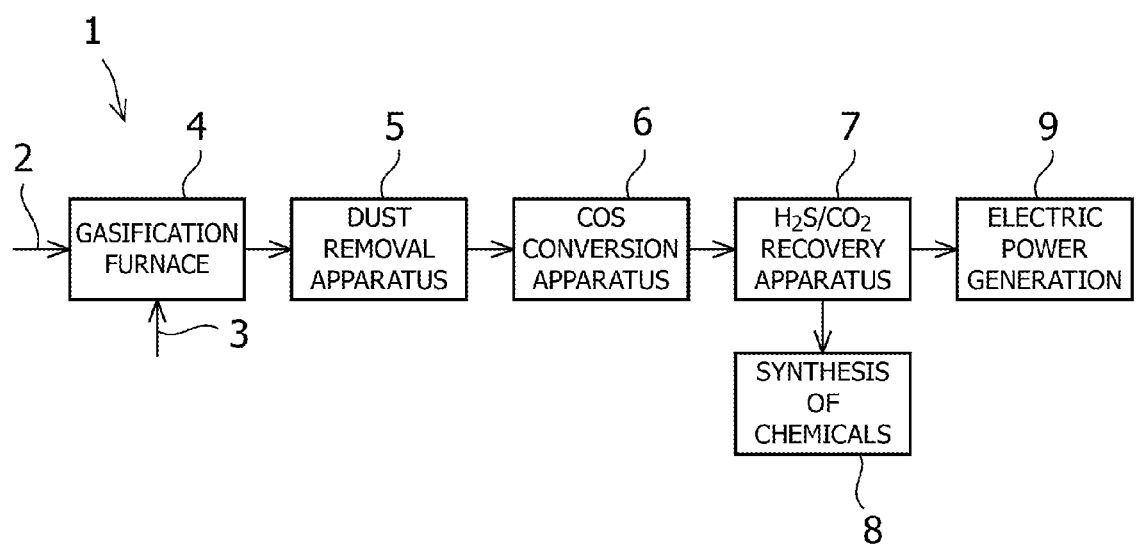

CATALYST FOR HYDROLYSIS OF CARBONYL SULFIDE AND HYDROGEN CYANIDE AND USE OF TITANIUM DIOXIDE-BASED COMPOSITION

TECHNICAL FIELD

The present invention relates to a catalyst for hydrolysis of carbonyl sulfide and hydrogen cyanide and use of a titanium dioxide-based composition.

BACKGROUND ART

Effective utilization of coal has attracted attention as a last resort to the recent energy issue. To convert coal to a high-value added energy medium, advanced technologies such as a technology for gasifying coal and a technology for purifying the gasified gas are employed.

The gasified coal gas contains carbonyl sulfide (COS) and hydrogen cyanide (HCN), which cause air pollution. Hence, it is important to remove these compounds in a gas purification step.

A purification process of gasified coal gas may be configured, for example, as shown in FIG. 1. Specifically, gas obtained by gasifying coal in a gasification furnace 4 and subjected to a dust removal treatment in a dust removal apparatus 5 is introduced into a COS conversion apparatus 6 to convert COS in the gas to carbon dioxide ($CO_2$) and hydrogen sulfide ($H_2S$), which are then recovered in an $H_2S/CO_2$ recovery apparatus 7. The thus purified gas is then used for synthesis 8 of chemicals, electric power generation 9, or the like.

Moreover, systems are also proposed in which the purified gas obtained by gasifying and purifying coal is applied to synthesis of chemicals such as methanol and ammonia or used directly for electric power generation. The electric power generation system includes the integrated coal gasification combined cycle (IGCC) system (for example, Patent Document 1). Specifically, in this system, coal is converted to a combustible gas in a high-temperature and high-pressure gasification furnace, and electric power is generated by a combination of a gas turbine and a steam turbine using the gasified gas as a fuel.

The COS conversion is based on the hydrolysis reaction represented by the following Formula (1), and an example of the catalyst for the hydrolysis is a catalyst obtained by supporting a metal carbonate on titanium dioxide (Patent Document 2).

[Math 1]

$$COS + H_2O \rightarrow CO_2 + H_2S \qquad (1)$$

Meanwhile, HCN can be converted to ammonia ($NH_3$) by the hydrolysis reaction of the following Formula (2) or the reaction of Formula (3), and the ammonia can be recovered. An example of the catalyst for hydrolysis of HCN is a titanium dioxide-based composition containing a combination of titanium dioxide, a sulfate of an alkaline-earth metal, and a doping compound (Patent Document 3).

[Math 2]

$$HCN + H_2O \rightarrow NH_3 + CO \qquad (2)$$

$$HCN + 3H_2 \rightarrow NH_3 + CH_4 \qquad (3)$$

PRIOR ART DOCUMENTS

Patent Documents

[Patent Document 1] Japanese Patent Application Publication No. 2004-331701

[Patent Document 2] Japanese Patent No. 3746609

[Patent Document 3] Japanese Patent No. 4556159

SUMMARY OF INVENTION

Technical Problems

Gasification and purification of coal requires many steps (FIG. 1). Hence, conducting each step in shorter period leads to shortening of the production period and reduction in costs.

For this reason, it can be said that, for example, providing a catalyst having better decomposition performance than hydrolysis catalysts used so far in the conversion step of COS and HCN is a novel object.

Solution to Problems

The present inventors have focused on the conversion step of COS and HCN, and reinvestigated the reaction mechanisms and reaction catalysts of the hydrolysis reactions of COS and HCN.

As a result, the present inventors have found that COS and HCN can be removed simultaneously at high degradation percentages when an active component containing a predetermined metal as a main component is supported on a titanium dioxide-based support having excellent corrosion resistance in a highly dispersed manner. This finding has led to the completion of the present invention.

Specifically, a first aspect according to the present invention is a catalyst for hydrolysis of carbonyl sulfide and hydrogen cyanide comprising at least: an active component containing, as a main component, at least one metal selected from the group consisting of barium, nickel, ruthenium, cobalt, and molybdenum; and a titanium dioxide-based support supporting the active component.

A second aspect according to the present invention is use of a titanium dioxide-based composition as a catalyst for hydrolyzing carbonyl sulfide and hydrogen cyanide, wherein the composition comprises at least: an active component containing, as a main component, at least one metal selected from the group consisting of barium, nickel, ruthenium, cobalt, and molybdenum; and a titanium dioxide-based support supporting the active component.

Advantageous Effects of Invention

The catalyst for hydrolysis of carbonyl sulfide and hydrogen cyanide and the use of a titanium dioxide-based composition of the present invention make it possible to remove COS and HCN simultaneously at high degradation percentages.

BRIEF DESCRIPTION OF DRAWINGS

FIG. 1 is a schematic diagram of an entire coal gasification and purification process.

DESCRIPTION OF EMBODIMENT

Hereinafter, a catalyst for hydrolysis of carbonyl sulfide and hydrogen cyanide and use of a titanium dioxide-based composition of the present invention are described in detail.

First, the catalyst of the present invention is a catalyst for hydrolyzing carbonyl sulfide and hydrogen cyanide, and comprises at least an active component containing, as a main component, at least one metal selected from the group consisting of barium, nickel, ruthenium, cobalt, and molybdenum. The use of any of these metals as the main component makes it possible to achieve satisfactorily high decomposition performance of not only carbonyl sulfide but also hydrogen cyanide. The main component may be a combination of any of the above-described metals, and the amount of the main component supported is preferably 0.1 to 25% by mass, and more preferably 5 to 22% by mass.

Moreover, the catalyst of the present invention comprises a titanium dioxide-based support supporting the active component. The titanium dioxide-based support may be titanium dioxide, a composite oxide of titanium dioxide with another oxide, or the like.

Such a support can immobilize the active component reliably. In addition, the support is chemically stable under operating conditions of the catalyst, and hence does not inhibit the activity of the catalyst.

Next, the use of the present invention is use of a titanium dioxide-based composition as a catalyst for hydrolyzing carbonyl sulfide and hydrogen cyanide. The titanium dioxide-based composition comprises at least an active component containing, as a main component, at least one metal selected from the group consisting of barium, nickel, ruthenium, cobalt, and molybdenum. Moreover, the titanium dioxide-based composition comprises a titanium dioxide-based support supporting the active component. The amount of the main component supported is preferably 0.1 to 25% by mass and more preferably 5 to 22% by mass. In addition, the titanium dioxide-based support may be titanium dioxide, a composite oxide of titanium dioxide with another oxide, or the like, for the reasons described above.

In the catalyst and the use of the present invention, the titanium dioxide-based composition is preferably obtained by adding, to the titanium dioxide-based support, at least one metal salt selected from the group consisting of barium carbonate, nickel carbonate, ruthenium nitrate, cobalt carbonate, and ammonium molybdate. This is because these materials are stable as raw materials.

In the titanium dioxide-based composition of the catalyst or the use of the present invention, titanium dioxide can be used as the titanium dioxide-based support. The use of titanium dioxide having an anatase-type crystal structure with a large specific surface area as the titanium dioxide is more preferable, because the amount of the active component supported increases, so that the catalytic activity improves.

Besides the above-described titanium dioxide, a titanium dioxide-based composite oxide can be used as the titanium dioxide-based support in the titanium dioxide-based composition of the catalyst or the use of the present invention.

When titanium dioxide is converted to a composite metal oxide, the specific surface area increases, and the heat resistance also improves.

The titanium dioxide-based composite oxide may be at least one selected from the group consisting of composite oxides of titanium dioxide and silicon dioxide, composite oxides of titanium dioxide and aluminum oxide, and composite oxides of titanium dioxide and zirconium dioxide. The composite ratio of titanium dioxide to the metal oxide composited with the titanium dioxide is preferably 1:99 to 99:1, and particularly preferably in a range from 50:50 to 95:5. This is because the specific surface area on which the active component is supported can be large in this range.

In the catalyst and the use of the present invention, the titanium dioxide-based composition preferably has a honeycomb shape. This is because clogging and pressure drop of the catalyst and the titanium dioxide-based composition can be prevented even in a situation in which dust or the like is coexistent, so that the catalyst can be maintained in a highly active state.

In the catalyst and the use of the present invention, the titanium dioxide-based composition can be produced, for example, as follows. Specifically, any of the above-described metal salts is added to a powder of the titanium dioxide-based support, and further a binder and a plasticizer are added. Then, the mixture is kneaded, molded into a spherical shape, a pellet shape, or a honeycomb shape, as appropriate, and then dried and calcined.

In addition, when the support is made of a titanium dioxide-based composite oxide, it is necessary to prepare the composite oxide in advance. The composite oxide can be prepared, for example, as follows. Specifically, coprecipitation is conducted by adding dropwise an alkali solution of ammonia or the like to an aqueous solution of metal salts such as nitrates, chlorides, and sulfates of metals such as titanium, silicon, aluminum, and zirconium. Thus, a composite hydroxide is formed. Then, the composite hydroxide is, for example, rinsed, dried, and calcined. The composite oxide can also be prepared by methods other than this method.

EXAMPLES

Hereinafter, the present invention is described more specifically based on Examples and Comparative Example. However, the present invention is not at all limited to the following Examples.

[Production of Catalysts for Hydrolysis]

Example 1

To 100 parts by mass of an anatase-type titanium dioxide powder (CSP-003 manufactured by JGC Catalysts and Chemicals Ltd.), 4 parts by mass, in terms of barium oxide, of barium carbonate (manufactured by HAYASHI PURE CHEMICAL IND., LTD., special grade reagent) was added, and 5 parts by mass of 10% ammonia water was added, followed by kneading with a kneader for 60 minutes. Next, to the kneaded material, 3 parts by mass of glass fiber and 5 parts by mass of kaolin as binders, 5 parts by mass of cellulose acetate as an organic plasticizer, and 5 parts by mass of 10% ammonia water were added, followed by kneading.

The kneaded material was extrusion molded to obtain a monolithic honeycomb molded article having a pitch of 5.0 mm and a wall thickness of 1.0 mm. The molded article was dried at room temperature until the water content reached 10%, and then calcined at 500° C. for 5 hours to remove the organic plasticizer. Thus, a honeycomb catalyst was obtained.

Example 2

A honeycomb catalyst was obtained in the same method as in Example 1, except that 4 parts by mass, in terms of nickel oxide, of nickel carbonate (manufactured by HAYASHI PURE CHEMICAL IND., LTD., special grade reagent) was added instead of barium carbonate.

Example 3

A honeycomb catalyst was obtained in the same method as in Example 1, except that 0.1 parts by mass, in terms of ruthenium, of ruthenium nitrate (manufactured by Tanaka Kikinzoku Kogyo K. K., Ru content: 50 g/L) was added instead of barium carbonate.

Example 4

A honeycomb catalyst was obtained in the same method as in Example 1, except that 4 parts by mass, in terms of nickel oxide, of nickel carbonate and 10 parts by mass, in terms of molybdenum oxide, of ammonium molybdate (manufactured by HAYASHI PURE CHEMICAL IND., LTD., special grade) were added instead of barium carbonate.

Example 5

A honeycomb catalyst was obtained in the same method as in Example 1, except that 5 parts by mass, in terms of cobalt oxide, of cobalt carbonate (manufactured by HAYASHI PURE CHEMICAL IND., LTD., special grade) and 10 parts by mass, in terms of molybdenum oxide, of ammonium molybdate were added instead of barium carbonate.

Example 6

A honeycomb catalyst was obtained in the same method as in Example 1, except that a composite oxide of titanium dioxide and silicon dioxide obtained as follows was used as the support. Specifically, 1125.8 g of $Ti(Oi-C_3H_7)_4$ as a Ti source and 57.6 g of $Si(OC_2H_5)_4$ were mixed with each other. The mixture was hydrolyzed by being added to 15000 g of water at 80° C., and further aged by being stirred in water at the same temperature for 2 hours. After the aging, the obtained product was filtered and washed sufficiently. Then, the product was dried and calcined (at 500° C. for 5 hours). Thus, the composite oxide of titanium dioxide and silicon dioxide was obtained.

Example 7

A honeycomb catalyst was obtained in the same method as in Example 6, except that a composite oxide of titanium dioxide and aluminum oxide obtained by using 316.8 g of $Al(Oi-C_3H_7)_3$ instead of $Si(OC_2H_5)_4$ used in Example 6 was used as the support.

Example 8

A honeycomb catalyst was obtained in the same method as in Example 6, except that a composite oxide of titanium dioxide and zirconium dioxide obtained by using 985.5 g of $Zr(O-iC_4H_9)_4$ instead of $Si(OC_2H_5)_4$ used in Example 6 was used as the support.

Comparative Example 1

To 100 parts by mass of an anatase-type titanium dioxide powder (CSP-003 manufactured by JGC Catalysts and Chemicals Ltd.), 5 parts by mass of 10% ammonia water was added, followed by kneading with a kneader for 60 minutes. Next, to the kneaded material, 3 parts by mass of glass fiber and 5 parts by mass of kaolin as binders, 5 parts by mass of cellulose acetate as an organic plasticizer, and 5 parts by mass of 10% ammonia water were added, followed by kneading.

The kneaded material was extrusion molded to obtain a monolithic honeycomb molded article having a pitch of 5.0 mm and a wall thickness of 1.0 mm. This molded article was dried at room temperature until the water content reached 10%, and it was then calcined at 500° C. for 5 hours to remove the organic plasticizer. Thus, a honeycomb catalyst was obtained.

[Hydrolysis Reaction of COS]

Hydrolysis reaction of COS was conducted by using the catalysts of Examples and Comparative Example described above under the test conditions shown in Table 1. The COS conversion was calculated by the following Formula (4). Table 2 shows the results.

[Math 3]

$$\text{COS conversion (\%)} = (1 - \text{Outlet COS concentration}/\text{Inlet COS concentration}) \times 100 \quad (4)$$

TABLE 1

| | (Gas composition) |
|---|---|
| Catalyst amount: 10 cc | $H_2$: 10% |
| Gas flow rate: 60 literN/h | CO: 25% |
| GHSV: 6000 $h^{-1}$ | $H_2O$: 3.2% |
| Pressure: 9 kgf/cm$^2$ | $CO_2$: 3.5% |
| Temperature: 300° C. | COS: 210 ppm |
| | $H_2S$: 880 ppm |
| | $N_2$: the balance |

TABLE 2

| | Catalyst composition | COS conversion (%) |
|---|---|---|
| Example 1 | $BaCO_3/TiO_2$ | 79 |
| Example 2 | $NiCO_3/TiO_2$ | 78 |
| Example 3 | $Ru(NO_3)_3/TiO_2$ | 76 |
| Example 4 | $NiCO_3 + (NH_4)_6Mo_7O_{24} \cdot 4H_2O/TiO_2$ | 80 |
| Example 5 | $CoCO_3 + (NH_4)_6Mo_7O_{24} \cdot 4H_2O/TiO_2$ | 78 |
| Example 6 | $BaCO_3/TiO_2SiO_2$ | 83 |
| Example 7 | $BaCO_3/TiO_2Al_2O_3$ | 80 |
| Example 8 | $BaCO_3/TiO_2ZrO_2$ | 79 |
| Comparative Example 1 | $TiO_2$ | 47 |

The results in Table 2 showed that each of the catalysts of the Examples was better in COS conversion performance than the catalyst of Comparative Example 1.

[Hydrolysis Reaction of HCN]

Hydrolysis reaction of HCN was conducted by using the catalysts of Examples and Comparative Example described above and actual gasified coal gas shown in Table 3. The HCN conversion was calculated by the following Formula (5). Table 4 shows the results.

[Math 4]

$$\text{HCN conversion (\%)} = (1 - \text{Outlet HCN concentration}/\text{Inlet HCN concentration}) \times 100 \quad (5)$$

TABLE 3

| | (Gas composition) Gasified gas composition |
|---|---|
| Catalyst amount: 10 liter | $H_2$: 10% |
| Gas flow rate: 60 m$^3$N/h | CO: 25% |
| GHSV: 6000 $h^{-1}$ | $H_2O$: 3.2% |

TABLE 3-continued

| | (Gas composition) Gasified gas composition |
|---|---|
| Pressure: 9 kgf/cm² Temperature: 300-350° C. | $CO_2$: 3.5% COS: 210 ppm $H_2S$: 880 ppm HCN : 1-70 ppm $N_2$: balance |

TABLE 4

| | Catalyst composition | HCN conversion (%) |
|---|---|---|
| Example 1 | $BaCO_3/TiO_2$ | 100 |
| Example 2 | $NiCO_3/TiO_2$ | 99 |
| Example 3 | $Ru(NO_3)_3/TiO_2$ | 99 |
| Example 4 | $NiCO_3 + (NH_4)_6Mo_7O_{24} \cdot 4H_2O/TiO_2$ | 100 |
| Example 5 | $CoCO_3 + (NH_4)_6Mo_7O_{24} \cdot 4H_2O/TiO_2$ | 99 |
| Example 6 | $BaCO_3/TiO_2SiO_2$ | 100 |
| Example 7 | $BaCO_3/TiO_2Al_2O_3$ | 99 |
| Example 8 | $BaCO_3/TiO_2ZrO_2$ | 100 |
| Comparative Example 1 | $TiO_2$ | 50 |

The results in Table 4 showed that each of the catalysts of Examples was better in HCN decomposition performance than the catalyst of Comparative Example 1.

From these results, it is apparent that the catalyst of the present invention is excellent in COS conversion performance and HCN decomposition performance.

INDUSTRIAL APPLICABILITY

The catalyst for hydrolysis of carbonyl sulfide and hydrogen cyanide and the use of a titanium dioxide-based composition of the present invention are industrially useful, because COS and HCN can be removed simultaneously at high degradation percentages.

REFERENCE SIGNS LIST

1 coal gasification and purification process
2 coal
3 oxygen
4 gasification furnace
5 dust removal apparatus
6 COS conversion apparatus
7 $H_2S/CO_2$ recovery apparatus
8 synthesis of chemicals
9 electric power generation

The invention claimed is:

1. A catalyst for hydrolysis of carbonyl sulfide and hydrogen cyanide, consisting of:
   an active component; and
   a titanium dioxide-based support supporting the active component, and being selected from the group consisting of composite oxides of titanium dioxide and silicon dioxide, composite oxides of titanium dioxide and aluminum oxide, and composite oxides of titanium dioxide and zirconium dioxide; and
   a binder selected from a group consisting of glass fiber and kaolin,
   wherein the catalyst for hydrolysis has a honeycomb structure,
   wherein the active component is ruthenium nitrate, and
   wherein starting materials of composite oxides of titanium dioxide and silicon dioxide are $Ti(Oi-C_3H_7)_4$ and $Si(OC_2H_5)_4$, starting materials of composite oxides of titanium dioxide and aluminum oxide are $Ti(Oi-C_3H_7)_4$ and $Al(Oi-C_3H_7)_3$, and starting materials of composite oxides of titanium dioxide and zirconium dioxide are $Ti(Oi-C_3H_7)_4$ and $Zr(Oi-C_4H_9)_4$.

2. A method for manufacturing a catalyst as a catalyst for hydrolyzing carbonyl sulfide and hydrogen cyanide, the method comprising a step of kneading a kneaded material obtained by adding an active component to a titanium dioxide-based support obtained by mixing starting materials thereof and then hydrolyzing the mixture, to produce the catalyst according to claim 1, wherein
   the catalyst consists of:
   the active component; and
   the titanium dioxide-based support supporting the active component, and selected from the group consisting of composite oxides of titanium dioxide and silicon dioxide, composite oxides of titanium dioxide and aluminum oxide, and composite oxides of titanium dioxide and zirconium dioxide; and
   a binder selected from a group consisting of glass fiber and kaolin,
   wherein the catalyst has a honeycomb structure,
   wherein the active component is ruthenium nitrate, and
   wherein starting materials of composite oxides of titanium dioxide and silicon dioxide are $Ti(Oi-C_3H_7)_4$ and $Si(OC_2H_5)_4$, starting materials of composite oxides of titanium dioxide and aluminum oxide are $Ti(Oi-C_3H_7)_4$ and $Al(Oi-C_3H_7)_3$, and starting materials of composite oxides of titanium dioxide and zirconium dioxide are $Ti(Oi-C_3H_7)_4$ and $Zr(Oi-C_4H_9)_4$.

* * * * *